(12) United States Patent
Ishikawa

(10) Patent No.: US 7,245,914 B2
(45) Date of Patent: Jul. 17, 2007

(54) OPERATION DATA CREATING METHOD AND APPARATUS FOR MOBILE COMMUNICATION SYSTEM AND STORAGE MEDIUM

(75) Inventor: Yoshihiro Ishikawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 237 days.

(21) Appl. No.: 09/897,102

(22) Filed: Jul. 3, 2001

(65) Prior Publication Data

US 2002/0022482 A1    Feb. 21, 2002

(30) Foreign Application Priority Data

Jul. 5, 2000    (JP)    ............................ 2000-204226
Apr. 26, 2001  (JP)    ............................ 2001-130229

(51) Int. Cl.
*H04Q 7/20*    (2006.01)

(52) U.S. Cl. .................. 455/436; 455/440; 455/437

(58) Field of Classification Search ............ 455/432.1, 455/435.3, 450, 452.2, 436, 438, 439, 440, 455/442, 446, 423, 424, 425, 67.11, 67.14, 455/67.16, 67.17, 4
See application file for complete search history.

(56) References Cited

U.S. PATENT DOCUMENTS

| | | | | |
|---|---|---|---|---|
| 5,307,510 | A * | 4/1994 | Gunmar et al. | 455/67.11 |
| 5,802,473 | A * | 9/1998 | Rutledge et al. | 455/446 |
| 5,854,981 | A * | 12/1998 | Wallstedt et al. | 455/439 |
| 6,047,185 | A * | 4/2000 | Sanden | 455/446 |
| 6,289,220 | B1 * | 9/2001 | Spear | 455/436 |

(Continued)

FOREIGN PATENT DOCUMENTS

GB    2 308 952    7/1997

(Continued)

OTHER PUBLICATIONS

Fujii et al., NTT DoCoMo Technical Journal, vol. 2, No. 4, pp. 28-34, "Cell Design System for Mobile Communication", Jan. 1995.*

(Continued)

*Primary Examiner*—Matthew Anderson
*Assistant Examiner*—Angelica M. Perez
(74) *Attorney, Agent, or Firm*—Oblon, Spivak, McClelland, Maier & Neustadt, P.C.

(57) ABSTRACT

An operation data creating method and apparatus for creating operation data indicating with respect to each base station other base stations related to each base station, based on a communication quality level with respect to each base station at each local position within a service area in a mobile communication system which includes a plurality of base stations set up within the service area and a mobile station which makes a wireless communication with the base stations, by creating quality information indicating the communication quality level with respect to each base station at each local position within the service area, selecting base stations having a second or subsequent communication quality level at each local position where the same base station of interest has a highest communication quality level, based on the created quality information with respect to each base station at each local position, and creating the operation data indicating the selected base stations as the other base stations related to the base station of interest having the highest communication quality level.

23 Claims, 9 Drawing Sheets

U.S. PATENT DOCUMENTS

| | | | | |
|---|---|---|---|---|
| 6,442,393 | B1 * | 8/2002 | Hogan | 455/456.5 |
| 6,728,540 | B1 * | 4/2004 | DeSantis et al. | 455/437 |
| 2001/0024953 | A1 * | 9/2001 | Balogh | 455/432 |

FOREIGN PATENT DOCUMENTS

| | | | |
|---|---|---|---|
| GB | 2308952 | * | 7/1997 |
| JP | 4-185026 | * | 7/1992 |
| JP | 4-224275 | * | 7/1997 |
| JP | 9-224275 | | 8/1997 |
| JP | 10-51834 | * | 2/1998 |
| JP | 10-51836 | * | 2/1998 |

OTHER PUBLICATIONS

Oomatsuzawa, et al., NTT DoCoMo Technical Journal, vol. 4, No. 1, pp. 28-31, "Station Design Total Support System", Apr. 1996.*

Fujii et al., NTT DoCoMo Technical Journal, vol. 2, No. 4, pp. 28-34, "Cell Design System for Mobile Communication", Jan. 1995, (with partial English translation).

Oomatsuzawa, et al., NTT DoCoMo Technical Journal, vol. 4, No. 1, pp. 28-31, "Station Design Total Support System", Apr. 1996, (with partial English translation).

* cited by examiner

OPERATION DATA CREATING METHOD AND APPARATUS FOR MOBILE COMMUNICATION SYSTEM AND STORAGE MEDIUM

BACKGROUND OF THE INVENTION

This application claims the benefit of Japanese Patent Applications No.2000-204226 filed Jul. 5, 2000 and No.2001-130229 filed Apr. 26, 2001, in the Japanese Patent Office, the disclosure of which is hereby incorporated by reference.

1. Field of the Invention

The present invention generally relates to operation data creating methods and apparatuses for mobile communication systems and storage media, and more particularly to an operation data creating method and an operation data creating apparatus which create operation data for use in a handover process of a mobile station in a cellular mobile communication system, and to a computer-readable storage medium which stores a program for causing a computer to create the operation data.

2. Description of the Related Art

In a conventional cellular mobile communication system such as the personal digital cellular (PDC) system, communication services are provided by dividing a service area into relatively small radio zones called cells, as shown in FIG. 1. In other words, a wireless channel is set between a base station 200 which covers each radio zone and a mobile station 100 which is located within the zone, and a communication is made via the wireless channel which is set between the base station 200 and the mobile station 100.

A communication quality level between the mobile station 100 and the base station 200 is affected by a radio wave attenuation which is dependent upon a distance between the mobile station 100 and the base station 200 and a radio wave propagation loss which is dependent upon arrangements of surrounding geometrical features, buildings and the like. On the other hand, when communicating between the mobile station 100 and the base station 200, a receiving end requires a reception power which is greater than a predetermined value in order to receive and demodulate signals with a predetermined quality. Accordingly, an optimum base station 200 which is to communicate with the mobile station 100 changes with time as the mobile station 100 moves. For this reason, the mobile station 100 constantly searches for the base station 200 which can secure an optimum communication quality level, and when a base station 200 which can secure a better communication quality level is found, a so-called handover process is carried out to set a new connection between the mobile station 100 and the newly found base station 200.

In order to carry out the handover process, the mobile station 100 constantly searches for a base station 200 which is located in a neighborhood of the base station 200 with which the mobile station 100 is communicating and is capable of securing a better communication quality level. In order to notify information for identifying the base station 200 and information related to the mobile communication system to the mobile communication system 100, each base station 200 broadcasts the information using a control channel which is used in common by a large number of users (mobile stations 100). Hence, the mobile station 100 can search and identify the base station 200 by receiving the information from the control channel.

Known wireless access systems employed in the mobile communication system include frequency division multiple access (FDMA), time division multiple access (TDMA) and code division multiple access (CDMA). For the common control channel described above, different radio frequencies are allocated for each of the base stations 200 in the case of the FDMA and the TDMA, and different spread codes are allocated for each of the base stations 200 in the case of the CDMA. In other words, the mobile station 100 can search for the neighboring base stations 200 by successively receiving signals of predetermined radio frequencies or predetermined spread codes.

In order to maintain a high communication quality level between the mobile station 100 which moves and each of the base stations 200, the mobile station 100 must frequently search for the neighboring base stations 200. However, it is impractical to search for all of the radio frequencies or spread codes used within the mobile communication system, because this would require considerable time and power. Hence normally, each base station 200 notifies to the mobile station, as the operation data for the handover control, a table (hereinafter referred to as a neighboring zone table) which indicates the radio frequencies and the spread codes which are used as the common control channel by the other base stations 200 located in the neighborhood of the base station 200. The mobile station 100 searches the neighboring base stations 200 by referring to this neighboring zone table.

Conventionally, the neighboring zone table is created in the following manner.

The radio wave propagation state within the service area is evaluated by simulating the radio wave propagation based on the elevation data, geometrical feature data, information related to the base and mobile stations and the like which are stored for each local position (small region) within the service area. For example, techniques for evaluating the radio wave propagation state are proposed in Fujii, Asakura and Yamazaki, "Cell Design System for Mobile Communication", NTT Docomo Technical Journal Vol.2, No.4, pp.28-34, 1995-01, and Oomatsuzawa and Yamashita, "Station Design Total Support System", NTT Docomo Technical Journal Vo.4, No.1, pp.28-31, 1996-04.

Based on the evaluation result of the radio wave propagation state within the service area, an area where the radio wave reception level from each base station becomes greater than or equal to a predetermined level is determined as a territory of each base station. A base station of a territory which is adjacent to the territory of each base station which is determined in this manner, is determined as a neighboring base station of each base station. The neighboring zone table which is created indicates the neighboring base station which is determined for each base station.

The neighboring zone table (operation data for the handover control) which is created by the above described technique indicates a base station of a territory which is adjacent to a territory of a certain base station, as a related base station located in the neighborhood of the certain base station.

However, with respect to each base station, the neighboring zone table only indicates the base station of the territory which is adjacent to the territory of each base station. For this reason, it is difficult to reflect in detail the radio wave propagation state within the service area, which varies depending on the structure and arrangement of the buildings, the geometrical feature data and the like, in the neighboring zone data. Consequently, when carrying out the handover control using the neighboring zone table which is created in this manner as the operation data, it is not always the case that a high communication quality level is maintained.

SUMMARY OF THE INVENTION

Accordingly, it is a general object of the present invention to provide a novel and useful operation data creating method and apparatus and computer-readable storage medium, in which the problems described above are eliminated.

Another and more specific object of the present invention is to provide an operation data creating method and apparatus and a computer-readable storage medium which can create operation data for handover control, enabling the handover control in a state where a high communication quality level is maintained.

Still another object of the present invention is to provide an operation data creating method or apparatus or computer-readable storage medium, adapted for use in a mobile communication system which includes a plurality of base stations set up within a service area and a mobile station which makes a wireless communication with the base stations, for creating operation data indicating information on neighboring base stations of an arbitrary base station based on communication quality levels of the base stations at each local position within the service area, wherein the operation data of the arbitrary base station are created from quality information related to base stations having second and subsequent communication quality levels at each position where a base station of interest is the best base station in terms of the communication quality level that is evaluated at each position for a plurality of base stations within the service area of the mobile communication system.

According to the operation data creating method or apparatus or computer-readable storage medium of the present invention, when the quality information indicating the communication quality level with respect to each base station at each local position within the service area is created, the base stations having the second or subsequent communication quality levels at each local position where the same base station of interest has the highest communication quality level are selected. Generally, each local position where the same base station of interest has the highest communication quality level, corresponds to each local position within the radio zone of the base station. The base stations having the second or subsequent communication quality levels at each local position are the other base stations having the second or subsequent communication quality levels at each local position within the radio zone, and are candidates of a base station to which a handover is to be made from the mobile station within the radio zone.

When the base stations are selected as described above, the operation data, indicating the selected base stations as the other base stations which are related to the base station of interest having the highest communication quality level, are created. The operation data can be used for the handover process with respect to the mobile station which is located within the radio zone of the base station of interest having the highest communication quality level.

Hence, according to the operation data creating method or apparatus or computer-readable storage medium described above, the operation data which are created include not only information on the base station of the radio zone adjacent to the radio zone of the base station of interest having the highest communication quality level, but also information on the other base stations which are selected depending on the communication quality levels and are related to the base station of interest having the highest communication quality level. In other words, it is possible to include in the operation data the base station which has a good communication quality level and is selected from a wider range. As a result, in the mobile communication system in which the handover control is carried out using such operation data, it is possible to carry out the handover of the mobile station in a state where a higher communication quality level is maintained.

The communication quality level with respect to each base station at each local position is not limited to a particular parameter, as long as the communication quality level is on the order of the communication quality level used when communicating with each base station at each local position. For example, the reception power and the reception signal to interference power ratio (SIR) of the signal from each base station, the interference level from another station, the reception power of each base station and the like may be used as the communication quality level.

For example, as techniques for obtaining the above quality information, the communication quality level with respect to each base station at each local position within the service area may be computed by estimation according to a predetermined algorithm, and the quality information may be created based on a computed result or, the communication quality level with respect to each base station at each local position within the service area may be measured, and the quality information may be created based on a measured result.

From the point of view of preventing operation data indicating the same base station a plurality of times from being created, the operation data creating method or apparatus or computer-readable storage medium may be constructed so that, when selecting the base stations having the second or subsequent communication quality level at each local position where the same base station of interest has the highest communication quality level, one of the base stations having the second or subsequent communication quality level is selected if the same base station has the second or subsequent communication quality level at a plurality of local positions.

From the point of view of selecting the base station to be included in the operation data as easily as possible, the operation data creating method or apparatus or computer-readable storage medium may be constructed so as to include creating a list having the base stations arranged at positions in an order from a highest communication quality level based on the created quality information, with respect to each local position, selecting base stations located at a second or subsequent position of each list having the same base station positioned at a first position having the highest order in each list, and creating operation data indicating the selected base stations as the other base stations related to the base station located at the first position having the highest order in each list.

According to this operation data creating method or apparatus or computer-readable storage medium of the present invention, the list having the base stations arranged in the order from that having the highest communication quality level is created based on the quality information obtained for each local position. Since the base station can be selected according to the order in the list, it is possible to select the base station to be included in the operation data relatively easily.

From the point of view of creating the operation data indicating the base stations arranged in the priority order, the operation data creating method or apparatus or computer-readable storage medium may be constructed so that, when selecting the base stations located at the second or subsequent position in each list having the same base station positioned at the first position having the highest order in each list, the base stations are successively selected from the positions having the higher order in each list, and the operation data created indicate the selected base stations as the other base stations related to the base station at the first position having the highest order in each list, in a state where the selected base stations are arranged in the selected order.

According to this operation data creating method or apparatus or computer-readable storage medium of the present invention, the operation data which are created indicate the base stations arranged in the order so that the base stations located at the positions in the higher order of each list, that is, the base stations having the higher communication quality levels, are positioned in the higher order in each list. As a result, by successively searching from the base stations which are indicated by the operation data and located at the positions in the higher order of each list, it is possible to carry out an efficient handover control.

From the point of view of putting the priority order with respect to each base station located at the same order in each list, the operation data creating method or apparatus or computer-readable storage medium may be constructed so that, when successively selecting the base stations located at the second or subsequent positions in each list having the same base station located at the first position having the highest order in each list, from the base stations located at positions having the higher order in each list, score information corresponding to a number of the same base station located at the same position in each list is generated, and the operation data created indicate the selected base stations as the other base stations related to the base station at the first position having the highest order in each list, in a state where the score information is made to correspond to the same base station located at the same position in each list.

According to this operation data creating method or apparatus or computer-readable storage medium of the present invention, even in the case of the base stations having the same order in each list, the operation data which are created indicate the base stations with the higher score information arranged at the higher order in each list. As a result, it is possible to carry out a further efficient handover control, by successively searching from the base stations which are indicated by the operation data and located at the positions in the higher order in each list.

Other objects and further features of the present invention will be apparent from the following detailed description when read in conjunction with the accompanying drawings.

DESCRIPTION OF THE PREFERRED EMBODIMENTS

A description will now be given of embodiments of an operation data creating method according to the present invention, an operation data creating apparatus according to the present invention, and a computer-readable storage medium according to the present invention, by referring to FIG. 2 and the subsequent the drawings.

Figure 1:
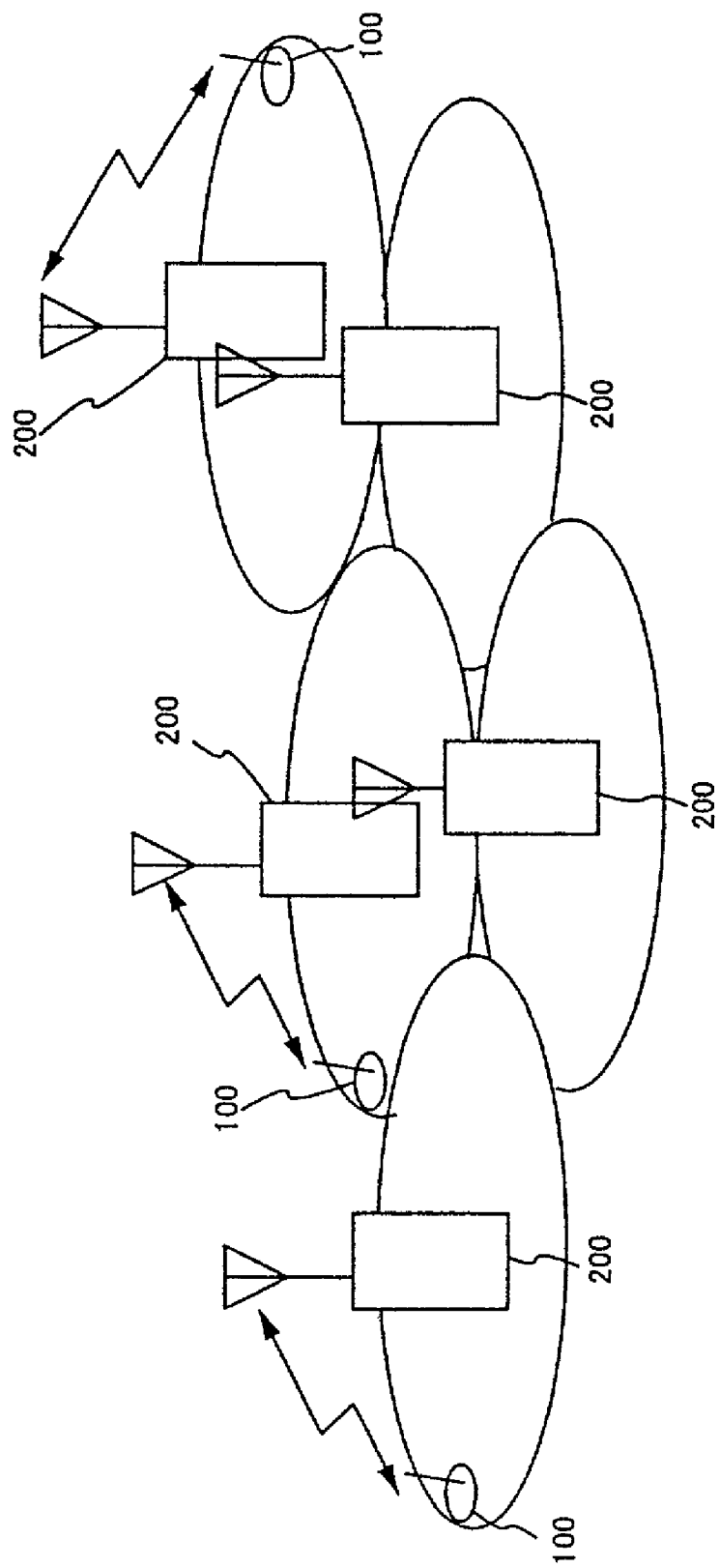
FIG. 1 is a diagram showing a structure of a cellular mobile communication system.

A mobile communication system to which a first embodiment of the operation data creating apparatus according to the present invention is applied, has the same structure as the mobile communication system shown in FIG. 1. This first embodiment of the operation data creating apparatus employs a first embodiment of the operation data creating apparatus according to the present invention and a first embodiment of the computer-readable storage medium according to the present invention. In other words, in the mobile communication system, the service area is divided into radio zones (cells), and a wireless channel is set between a base station 200 which covers a radio zone and a mobile station 100 which is located within the radio zone. A communication is made via the wireless channel which is set between the base station 200 and the mobile station 100.

In the mobile communication system described above, a neighboring zone table which is used as operation data for handover control, is created in the following manner.

Figure 2:
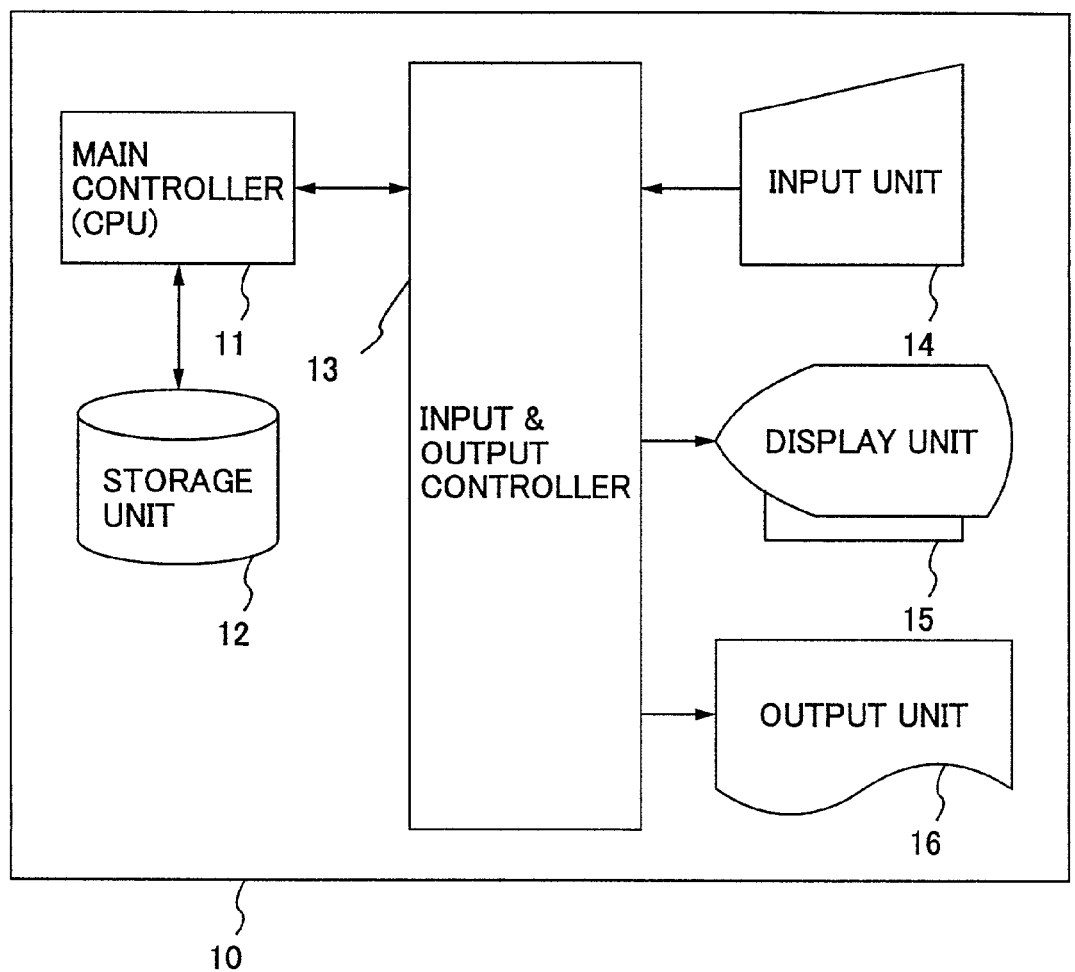
FIG. 2 is a diagram showing a structure of a neighboring zone table creating apparatus as a first embodiment of an operation data creating apparatus according to the present invention.

The neighboring zone table is created by a neighboring zone table creating apparatus 10 which has a basic structure similar to that of a known personal computer or the like, as shown in FIG. 2. The neighboring zone table creating apparatus 10 includes a main controller (CPU) 11, a storage unit 12, an input and output controller 13, an input unit 14, a display unit 15, and an output unit 16. The main controller 11 carries out a process for creating the neighboring zone table according to a program which is stored in a predetermined region of the storage unit 12.

The processes carried out by the program will be described later in conjunction with FIGS. 5, 7 and 8. Hence, in this embodiment, the computer-readable storage medium is formed by the storage unit 12. However, a recording medium forming the computer-readable storage medium according to the present invention is not limited to the storage unit 12, and the computer-readable storage medium may be formed by any kind of recording medium capable of storing the program in a manner readable by a computer, such as magnetic, optical and magneto-optical recording media, and semiconductor memory devices. The program may also be downloaded to such recording media from a network via a communication means.

Figure 3:
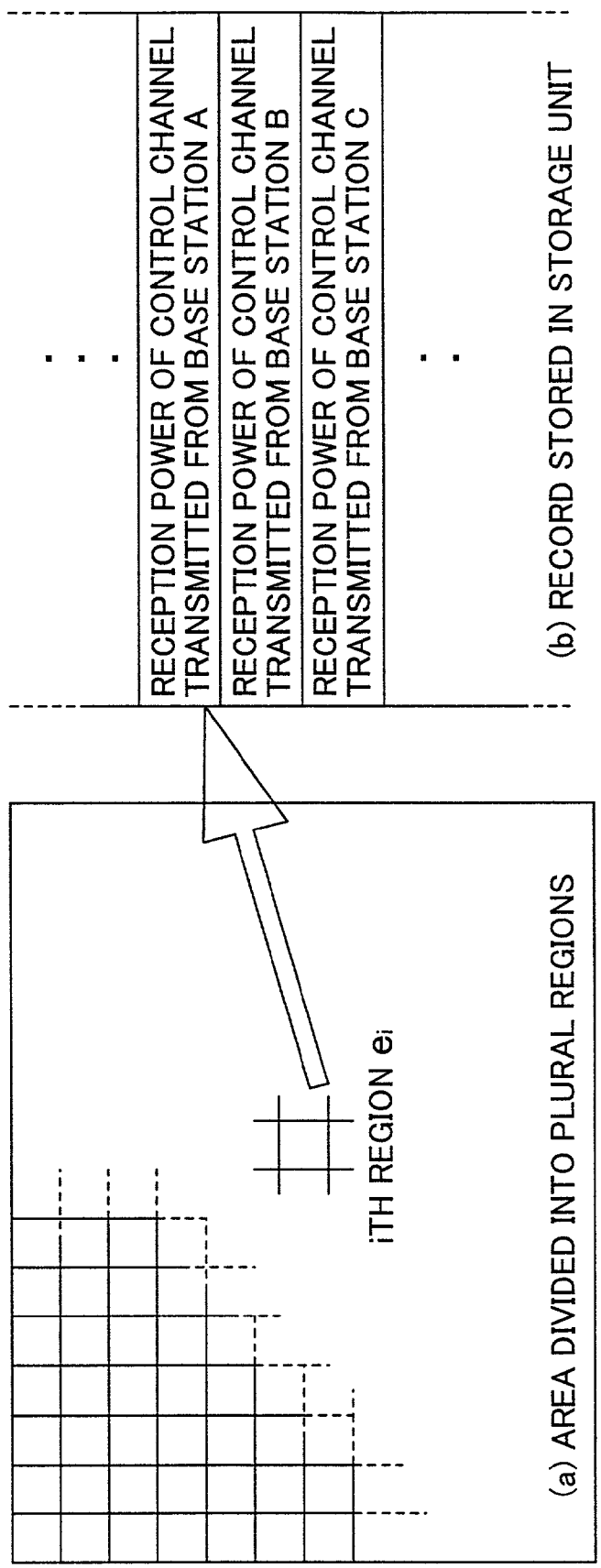
FIG. 3 is a diagram showing a structure of data indicating a communication quality level with respect to each base station in each small region created by the neighboring zone table creating apparatus shown in FIG. 2.

FIG. 3 is a diagram showing a structure of data indicating a communication quality level with respect to each base station in each small region created by the neighboring zone table creating apparatus 10 shown in FIG. 2. In FIG. 3, (a)

shows a service area which is divided into plural regions, and (b) shows a record stored in the storage unit 12.

For example, the service area is divided into a plurality of small regions as shown in FIG. 3(a). The small region is formed by a square area having a side which is several meters to several hundred meters, for example. Elevation data, geometrical feature data, data indicating a construction state of buildings and the like of each small region are input from the input unit 14. In addition, data indicating a communication performance such as the reception performance and the transmission power of the mobile station 100, position data such as the latitude and longitude indicating a set-up position of each base station 200, and data indicating a communication performance such as the transmission power and antenna height of each base station 200 are also input from the input unit 14. The various data input from the input unit 14 are stored in the storage unit 12 as data which are necessary to estimate a radio wave propagation state within the service area.

The main controller 11 simulates the radio wave propagation state within the service area using the various data stored in the storage unit 12. The simulation and evaluation of the radio wave propagation state are carried out by known techniques, similarly as in the conventional case. Furthermore, the main controller 11 computes a communication quality level with respect to each base station at a representative point (local position) of each small region $e_i$, such as a reception power of a common control channel from each base station and a reception signal to interference power ratio (SIR), according to a predetermined algorithm, based on the evaluation result. For example, a predetermined number of base stations which are determined in advance or, base stations having a communication quality level greater than or equal to a predetermined communication quality level which is determined in advance, become target base stations with respect to which the communication quality level such as the reception power in each small region $e_i$ is to be obtained. The communication quality level such as the reception power of the control channel from each base station, which is computed for each small region $e_i$, is stored in the storage unit 12 as quality information, as shown in FIG. 3(b), for example. FIG. 3(b) shows the record including reception powers of the control channels transmitted from base stations A, B, C, . . . .

In this particular case, the quality information with respect to each base station in each small region $e_i$, is computed based on an evaluation result which is obtained by simulating and evaluating the radio wave propagation state within the service area. However, it is of course possible to obtain the quality information by actually measuring the reception power of the common control channel from each base station or the reception SIR at the local position corresponding to the small region $e_i$.

Figure 4:
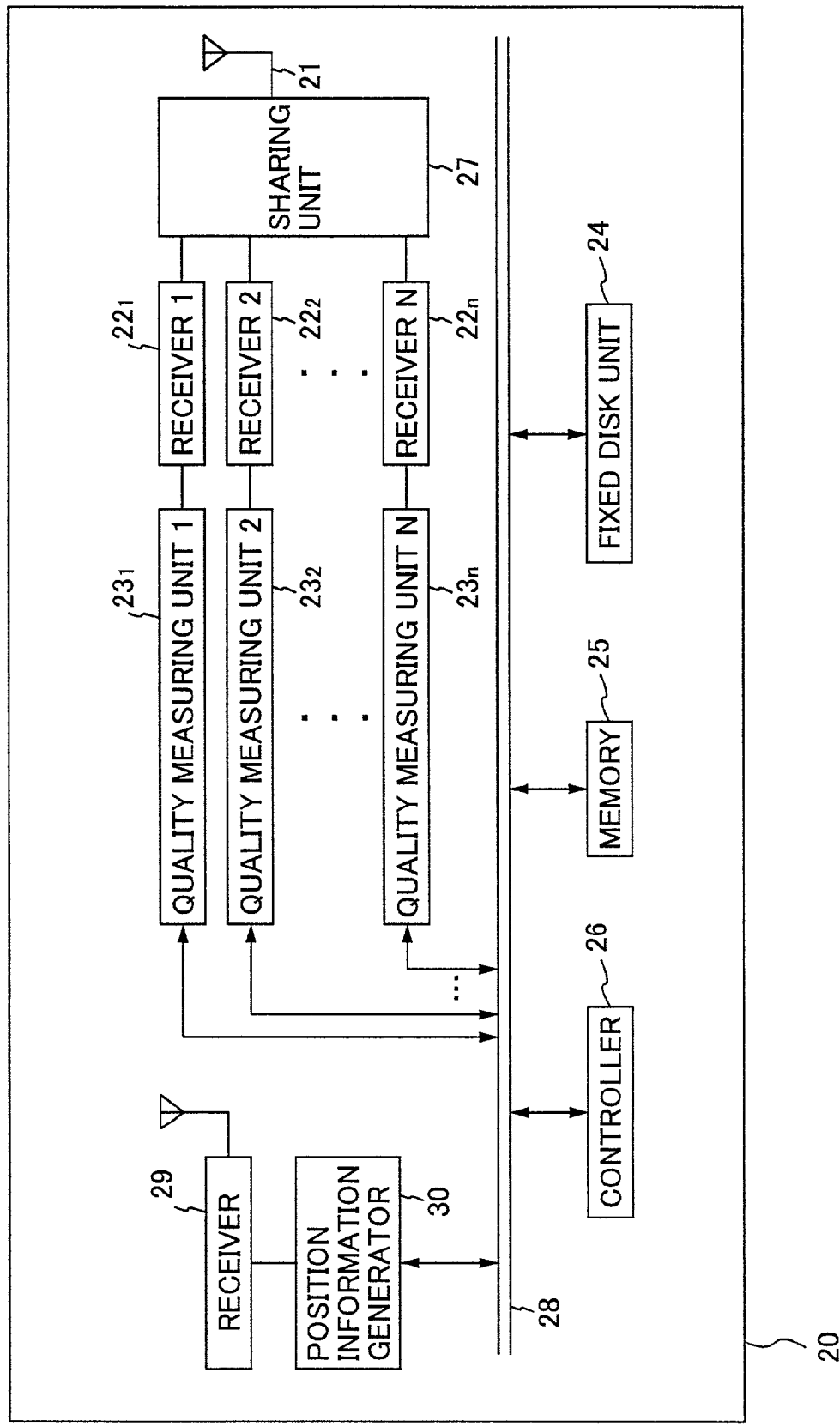
FIG. 4 is a diagram showing a structure of a measuring apparatus for measuring a reception power of a common control channel from each base station at each local position.

A measuring apparatus for actually measuring the reception power of the common control channel from each base station, for example, at each local position, may have a structure shown in FIG. 4. A measuring apparatus 20 shown in FIG. 4 is mounted on a vehicle, and measures, as the communication quality level, the reception power of the common control channel from each base station at each local position as the vehicle moves within the service area.

In FIG. 4, the measuring apparatus 20 includes receivers $22_1, 22_2, \ldots, 22_n$ which receive signals of the common control channel (radio frequencies and spread codes) used within the service area via an antenna 21 and a sharing unit 27, quality measuring units $23_1, 23_2, \ldots, 23_n$ which measure reception powers of the signals received by the corresponding receivers $22_1, 22_2, \ldots, 22_n$, a fixed disk unit 24, a memory unit 25, and a controller 26. The quality measuring units $23_1, 23_2, \ldots, 23_n$, the fixed disk unit 24, the memory unit 25, and the controller 26 are coupled via a bus 28.

The measuring apparatus 20 further includes a global positioning system (GPS) receiver 29 and a position information generator 30 which generates position information such as the latitude and longitude based on signals received by the GPS receiver 29. The position information generator 30 is coupled to the bus 28, and the position information generated from the position information generator 30 is supplied to the controller 26 via the bus 28.

When the vehicle which is mounted with the measuring apparatus 20 moves within the service area, the controller 26 acquires the actually measured value of the reception power of the common control channel received by each of the receivers $22_1, 22_2, \ldots, 22_n$ from each base station 200, every time the position information generated from the position information generator 30 matches the representative point within each small region $e_i$ set within the service area. The actually measured value of the reception power with respect to each base station 200 is stored in the fixed disk unit 24 in correspondence with each small region $e_i$, as shown in FIG. 3(a) and FIG. 3(b), for example.

The measuring apparatus 20 described above includes a plurality of receivers in correspondence with each of the common control channels, that is, radio frequencies and spread codes. However, the measuring apparatus 20 is not limited to such a structure, and may time-divisionally use a single receiver to receive from each of the common control channels. In addition, the measuring apparatus 20 may include a plurality of receivers which are respectively used to receive from a plurality of common control channels in time-division. By using such structures for the measuring apparatus 20, it is possible to increase the number of base stations which become targets from which the quality information is to be collected.

The reception power with respect to each base station at each small region $e_i$ which is actually measured and stored in the fixed disk unit 24, is input from the input unit 14 of the neighboring zone table creating apparatus 10 described above, and is further stored in the storage unit 12 via the input and output controller 13.

Figure 5:
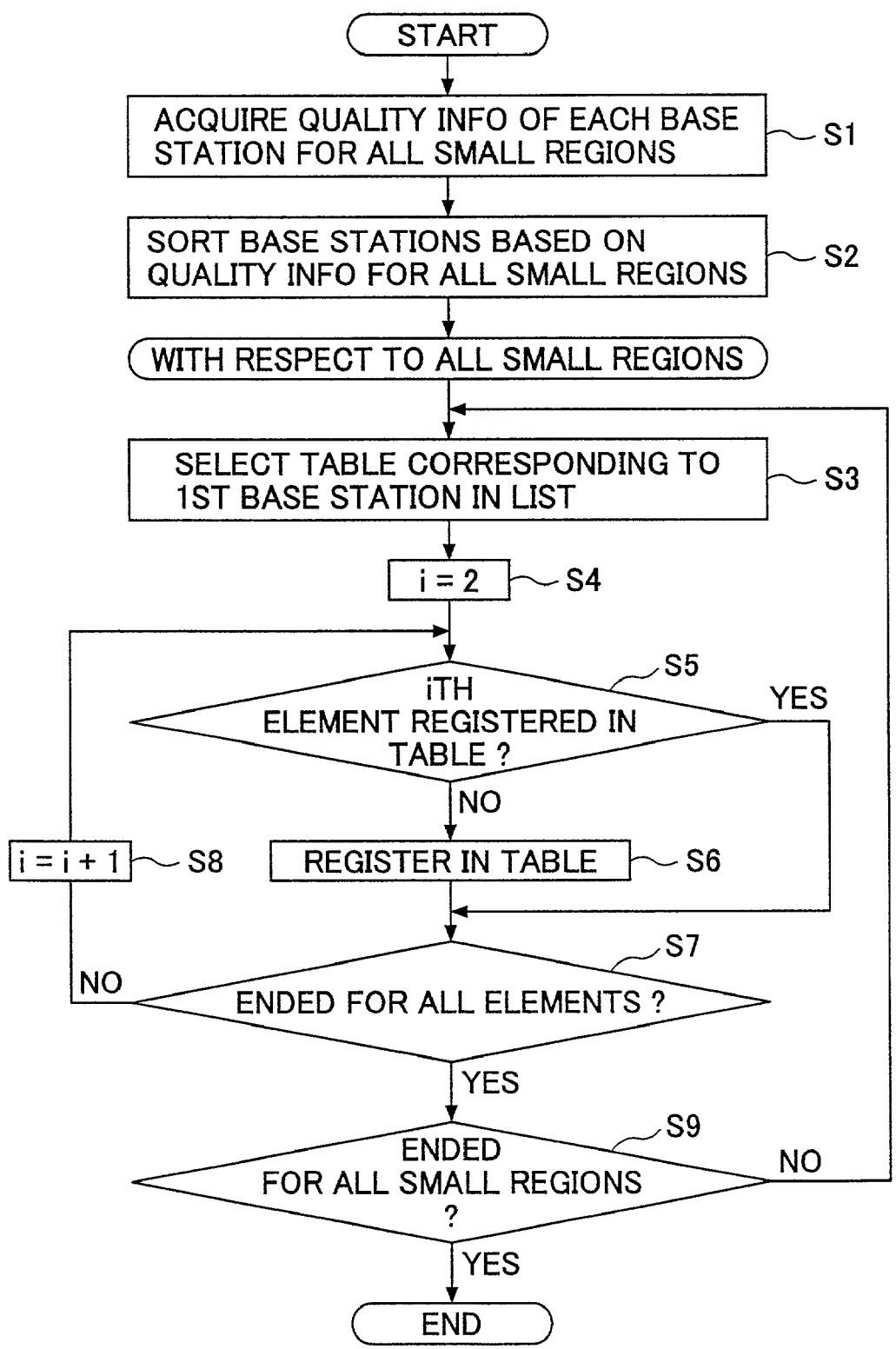
FIG. 5 is a flow chart for explaining a processing procedure for creating a neighboring zone table in the first embodiment of the operation data creating apparatus.

When the quality information indicating the communication quality level is stored in the storage unit 12, the main controller 11 creates the neighboring zone table according to a procedure shown in FIG. 5. FIG. 5 is a flow chart for explaining the operation of the first embodiment. As described above, the quality information indicates the communication quality level, such as the reception power, with respect to each base station in each small region $e_i$ computed according to the predetermined algorithm using the evaluation result of the simulated radio wave propagation state within the service area or, indicates the communication quality level with respect to each base station obtained by actually measuring the reception power or the like of the common control channel from each base station in each small region $e_i$ within the service area.

Figure 6:
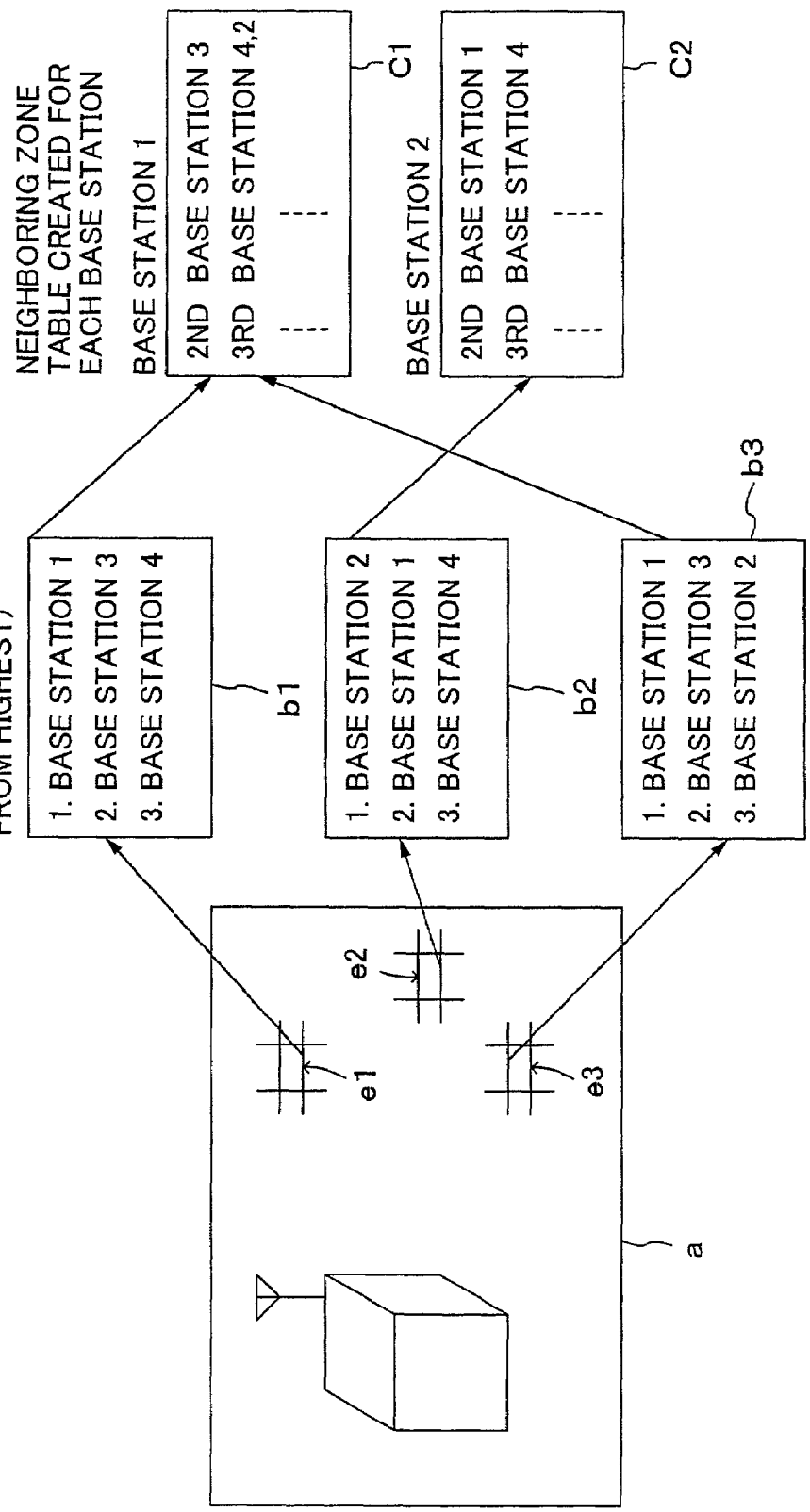
FIG. 6 is a diagram showing a relationship of a list corresponding to each small region and the neighboring zone table in the first embodiment.

In FIG. 5, the main controller 11 acquires the quality information with respect to each base station in each small region stored in the storage unit 12, in a step S1. Then, the main controller 11 sorts the base stations in an order from that having the highest communication quality level based on the acquired quality information, in a step S2. As a result, lists b1, b2, b3 and the like of the base stations arranged in the order from that having the highest communication quality level are generated for each small region, as shown in FIG. 6.

Thereafter, a similar process is repeatedly carried out with respect to the created lists of the base stations corresponding to all of the small regions.

A neighboring zone table corresponding to a base station located at a first position in a list which corresponds to a certain small region is selected in a step S3. For example, a neighboring zone table c1 corresponding to a base station 1 which is located at the first position in the list b1 corresponding to a certain small region e1 is selected as shown in FIG. 6. A counter i is set to an initial value 2 (i=2) in a step S4. Then, a decision is made to determine whether an element (base station) located at an ith (second) position in the list corresponding to the small region is already registered in the selected neighboring zone table, in a step S5. If the element (base station) located at the ith position in the list corresponding to the small region is not yet registered in the selected neighboring zone table and the decision result in the step S5 is NO, the base station is registered in the neighboring zone table in a step S6.

On the other hand, if the element (base station) located at the ith position in the list corresponding to the small region is already registered in the selected neighboring zone table and the decision result in the step S5 is YES, this element (base station) is not registered in order to avoid double registration. A decision is then made to determine whether or not the process ended with respect to all of the elements (base stations) in the list corresponding to the small region, in a step S7.

If the process has not ended with respect to all of the elements and the decision result in the step S7 is NO, the counter i is incremented by +1 (i=1+1) in a step S8, and a decision is made to determine whether or not a next element (for example, the base station located at the third position) in the list corresponding to the small region is already registered in the selected neighboring zone table, in a step S5. If this next element is not yet registered, this next element is registered in the neighboring zone table in a step S6, but this next element is not registered in the neighboring zone table if this next element is already registered.

Thereafter, the above described process of the steps S5 through S8 is repeatedly carried out with respect to each element (base station) specified by the counter i which is successively incremented. During this process, if the process with respect to all of the elements (base stations) in the list corresponding to the small region ends and the decision result in the step S7 is YES, a decision is further made to determine whether or not the process is ended with respect to the lists corresponding to all of the small regions, in a step S9. If the process has not ended with respect to the lists corresponding to all of the small regions and the decision result in the step S9 is NO, the neighboring zone table of the base station located at the first position in the list corresponding to the next small region is selected, in a step S3, and the above described process of the steps S5 through S8 is repeatedly carried out with respect to the second and subsequent elements (base stations) in the list. For example, a neighboring zone table c2 corresponding to a base station 2 which is located at the first position in the list b2 corresponding to the next small region e2 is selected as shown in FIG. 6, and the above described process is repeatedly carried out with respect to the second and subsequent elements (base stations 1, 4, . . . ) in the list b2.

When the registration process ends with respect to the elements (base stations) located at the second and subsequent positions in the lists with respect to the neighboring zone tables corresponding to the base stations located at the first position in the lists corresponding to all of the small regions by the procedure described above and the decision result in the step S9 is YES, all processes end.

As a result of the above described procedure, the elements (base stations) located at the second and subsequent positions in the lists which have the same base station located at the first position, are registered without overlap in the neighboring zone table corresponding to the base station located at the first position. For example, the elements (base stations 3, 4 and 2) located at the second and subsequent positions in the lists b1 and b3 which have the same base station 1 located at the first position, are registered without overlap in the neighboring zone table c1 corresponding to the base station 1 located at the first position, as shown in FIG. 6.

According to this method of creating the neighboring zone table, the base stations to be registered in the neighboring zone table corresponding to each base station are determined based on the communication quality level with respect to each base station obtained for each small region. Hence, in the neighboring zone table corresponding to each base station, not only the base stations of the radio zone adjacent to the radio zone of each base station, but the base stations of other radio zones can also be registered depending on the communication quality level. In other words, the base stations from a wider range and capable of obtaining a good communication quality level can be registered in the neighboring zone table. As a result, in the mobile communication system which carries out the handover control using such a neighboring zone table, it is possible to carry out the handover of the mobile station 100 while maintaining a high communication quality level.

In this embodiment, the elements (base stations) in the list corresponding to each small region and the elements (base stations) registered in each neighboring zone table are not limited to the above, and may be any information corresponding to the base stations. For example, the information corresponding to the base stations includes identification information of each base station, and information indicating the frequency and the spread code of the common control channel corresponding to each base station (the same holds true for the case described hereunder).

Next, a description will be given of a second embodiment of the operation data creating apparatus according to the present invention. This second embodiment of the operation data creating apparatus employs a second embodiment of the operation data creating apparatus according to the present invention and a second embodiment of the computer-readable storage medium according to the present invention. The basic structure of this second embodiment of the operation data creating apparatus is the same as that of the first embodiment of the operation data creating apparatus described above.

Figure 7:
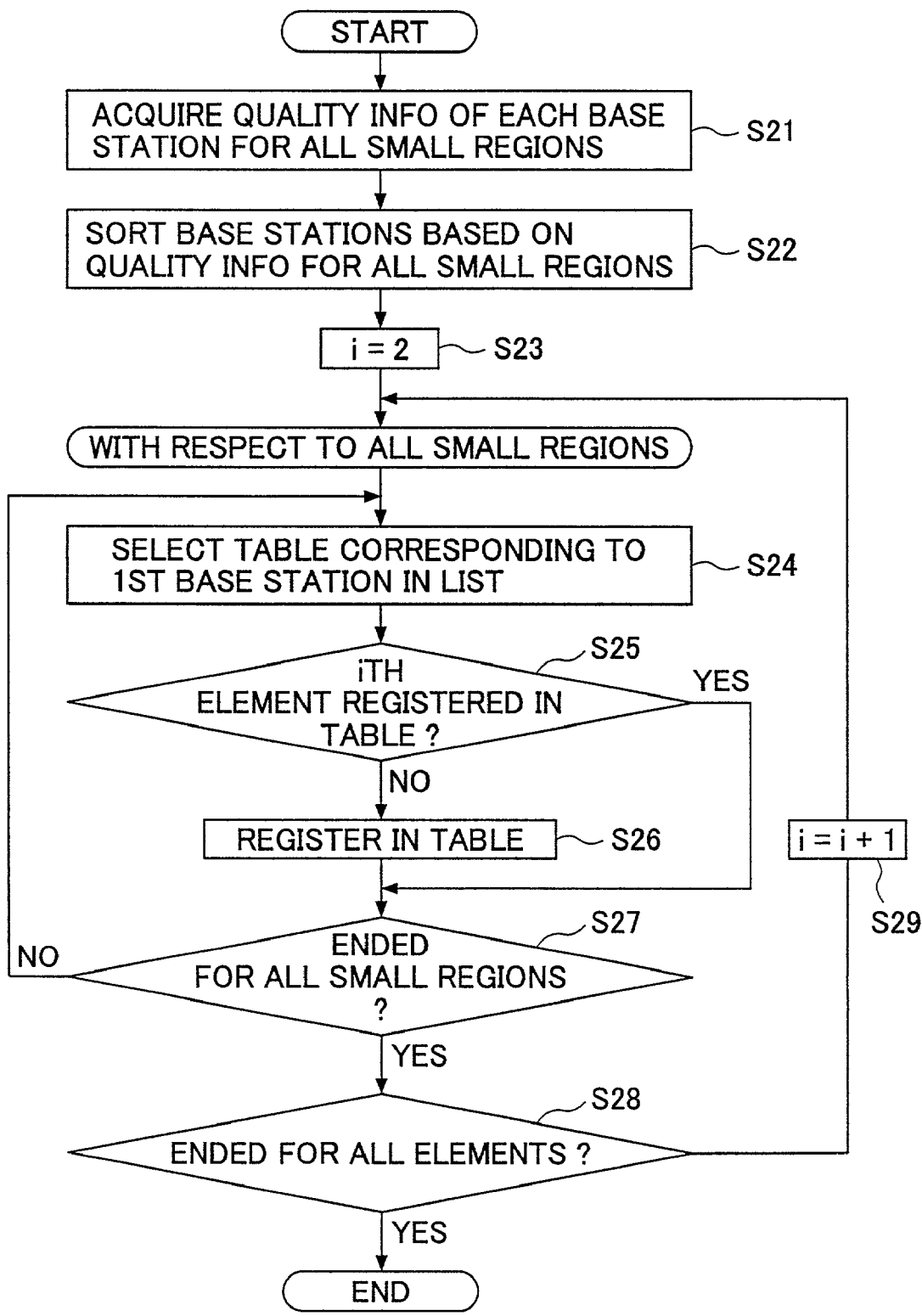
FIG. 7 is a flow chart for explaining a processing procedure for creating the neighboring zone table in a second embodiment of the operation data creating apparatus according to the present invention.

In this second embodiment, the main controller 11 creates the neighboring zone table corresponding to each base station according to a procedure shown in FIG. 7. FIG. 7 is a flow chart for explaining the operation of the second embodiment.

In FIG. 7, the main controller 11 acquires the quality information with respect to each base station in each small region stored in the storage unit 12, in a step S21, similarly as in the case of FIG. 5. Then, the main controller 11 sorts the base stations in an order from that having the highest communication quality level based on the acquired quality information, in a step S22. As a result, lists b1, b2, b3 and the like of the base stations arranged in the order from that having the highest communication quality level are generated for each small region, as shown in FIG. 6. A counter i is set to an initial value (i=2), in a step S23.

Thereafter, a similar process is repeatedly carried out with respect to the created lists of the base stations corresponding to all of the small regions, for each counter value i which is incremented.

A neighboring zone table corresponding to a base station located at a first position in a list which corresponds to a certain small region is selected, in a step S24. A decision is made to determine whether an element (base station) located at an ith (second) position in the list corresponding to the small region is already registered in the selected neighboring zone table, in a step S25. If the element (base station) located at the ith position in the list corresponding to the small region is not yet registered in the selected neighboring zone table and the decision result in the step S25 is NO, the base station is registered in the neighboring zone table in a step S26.

On the other hand, if the element (base station) located at the ith position in the list corresponding to the small region is already registered in the selected neighboring zone table and the decision result in the step S25 is YES, this element (base station) is not registered in order to avoid double registration. A decision is then made to determine whether or not the process ended with respect to all of the elements (base stations) in the list corresponding to the small region, in a step S27.

If the process has not ended with respect to all of the elements and the decision result in the step S27 is NO, the neighboring zone table corresponding to the base station located at the first position in the list corresponding to the next small region is selected in a step S24. Then, a decision is made to determine whether or not the element (base station) located at the same ith (second) position in the list corresponding to the next small region is already registered in the selected neighboring zone table, in a step S25. If the element (base station) located at the same ith position in the list corresponding to the next small region is not yet registered in the selected neighboring zone table and the decision result in the step S25 is NO, the base station is registered in the neighboring zone table in a step 326. On the other hand, if the element (base station) located at the same ith position in the list corresponding to the next small region is already registered in the selected neighboring zone table and the decision result in the step S25 is YES, this element is not registered in the neighboring zone table to avoid double registration.

Thereafter, the above described process of the steps S24 through S27 is repeatedly carried out with respect to the element (base station) located at the ith (second) position in the list corresponding to the small region, with respect to the lists corresponding to each of the small regions. When the process with respect to the element (base station) located at the ith (second) position in each of the lists corresponding to all of the small regions ends and the decision result in the step S27 is YES, a decision is further made to determine whether or not the process with respect to all of the elements (base stations) ended, in a step S28.

If the process with respect to all of the elements (base stations) is not yet ended and the decision result in the step S28 is NO, the counter i is incremented by +1 (i=i+1) in a step S29, and the process of the steps S24 through S29 is similarly carried out again with respect to the lists corresponding to all of the small regions. In other words, registration process to the neighboring zone table is carried out with respect to the ith (third) element (base station) of each list. Accordingly, the counter i is successively incremented by +1 and the above described process is similarly repeated, and all processes end when it is judged that the process with respect to all of the elements (base stations) has ended and the decision result in the step S28 is YES.

As a result of the above described procedure, the elements (base stations) 3, 4 and 2 located at the second and subsequent positions in the lists b1 and b3 corresponding to the small regions e1 and e3 and having the same base station 1 located at the first position, are registered without overlap in the neighboring zone table c1 corresponding to the base station 1 located at the first position, and so that the elements (base stations) located at positions having a higher order than those of the lists b1 and b3 are registered at a higher order, as shown in FIG. 6. Therefore, in the neighboring zone table c1 corresponding to the base station 1, the base station 3 located at the second position in the list b1 is registered at the highest order, and the base stations 4 and 2 respectively located at the third position in the list b1 and the third position in the list b3 are registered at the order lower than that of the base station 3.

According to this method of creating the neighboring zone table, the base station located at the position having the higher order in the list corresponding to each small region is registered at the higher order of the neighboring zone table corresponding to each base station. Hence, the base stations are arranged in the neighboring zone table corresponding to each base station, in a priority order depending on the communication quality level. By using the neighboring zone table in which the base stations are arranged in the priority order depending on the communication quality level, it is possible to carry out a more efficient handover control with respect to the mobile station 100. For example, by successively searching the reception power such as the communication quality level of the common control channel from the base station having the higher order in the neighboring zone table notified from the base station 200 in the radio zone in which the mobile station 100 is located, the mobile station 100 can search the base station from which a higher reception power or, a better communication quality level, can be obtained than the base station 200 in the radio zone in which the mobile station 100 is located, that is, search the base station to which the handover is to be made, within a shorter time.

Next, a description will be given of a third embodiment of the operation data creating apparatus according to the present invention. This third embodiment of the operation data creating apparatus employs a third embodiment of the operation data creating apparatus according to the present invention and a third embodiment of the computer-readable storage medium according to the present invention. The basic structure of this third embodiment of the operation data creating apparatus is the same as that of the first embodiment of the operation data creating apparatus described above.

Figure 8:
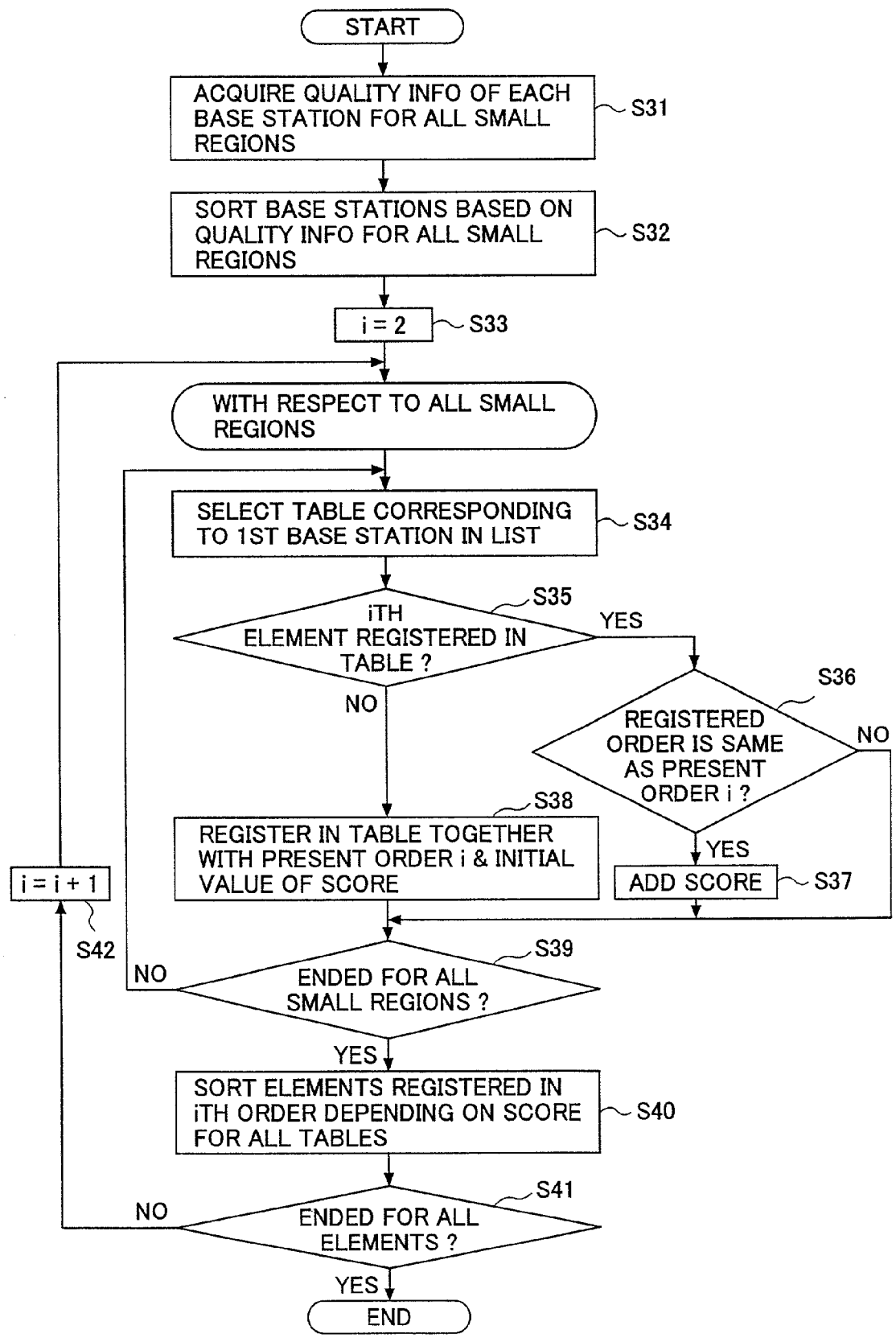
FIG. 8 is a flow chart for explaining a processing procedure for creating the neighboring zone table in a third embodiment of the operation data creating apparatus according to the present invention.

In this third embodiment, the main controller 11 creates the neighboring zone table corresponding to each base station according to a procedure shown in FIG. 8. FIG. 8 is a flow chart for explaining the operation of the third embodiment. According to this procedure, it is possible to mode clearly indicate the priority order of the base station which is registered in each neighboring zone table.

In FIG. 8, the main controller 11 acquires the quality information with respect to each base station in each small region stored in the storage unit 12, in a step S31, similarly as in the case shown in FIG. 7. Then, the main controller 11 sorts the base stations in an order from that having the highest communication quality level based on the acquired quality information, in a step S32. Thereafter, the main controller 11 successively registers the element (base station) located at the ith position in each list, to the neighboring zone table corresponding to the base station located at the first position in each list corresponding to each of the small regions in steps S33, S34, S35, S38 and S39, similarly to the case shown in FIG. 7.

During the above described registration process, if the element (base station) located at the ith position in the list corresponding to a certain small region is not yet registered in the neighboring zone table and the decision result in the step S35 is NO, this element (base station) is registered in the neighboring zone table, and the order i and an initial value of a score are registered in correspondence with the element (base station). The initial value of i is 2 and i is successively incremented, and the initial value of the score is 1, for example.

On the other hand, if the element (base station) located at the ith position in the list corresponding to the certain small region is already registered in the neighboring zone table and the decision result in the step S35 is YES, a decision is made to determine whether or not an order which is already registered in correspondence with the registered base station is equal to the order i (ith position) in the list, in a step S36. If the order which is already registered in the neighboring zone table so as to correspond to the registered base station matches the order i in the list and the decision result in the step S36 is YES, the score already registered so as to correspond to the registered base station is incremented by +1, for example, in a step S37. On the other hand, if the registered order does not match the order i in the list and the decision result in the step S36 is NO, no process related to the score is carried out.

When the above described process ends with respect to the ith base station in each list corresponding to each of the small regions and the decision result in the step S39 is YES, the elements (base stations) which are registered in the ith order in each of the neighboring zone tables are sorted in an order from that having the highest score, in a step S40. The score indicates the number of identical elements (base stations) located at the same order (ith position) in each list corresponding to each of the small regions. The higher the score of the base station, the larger the number of local positions (small regions) each having the base station at the same order of communication quality level.

Figure 9:
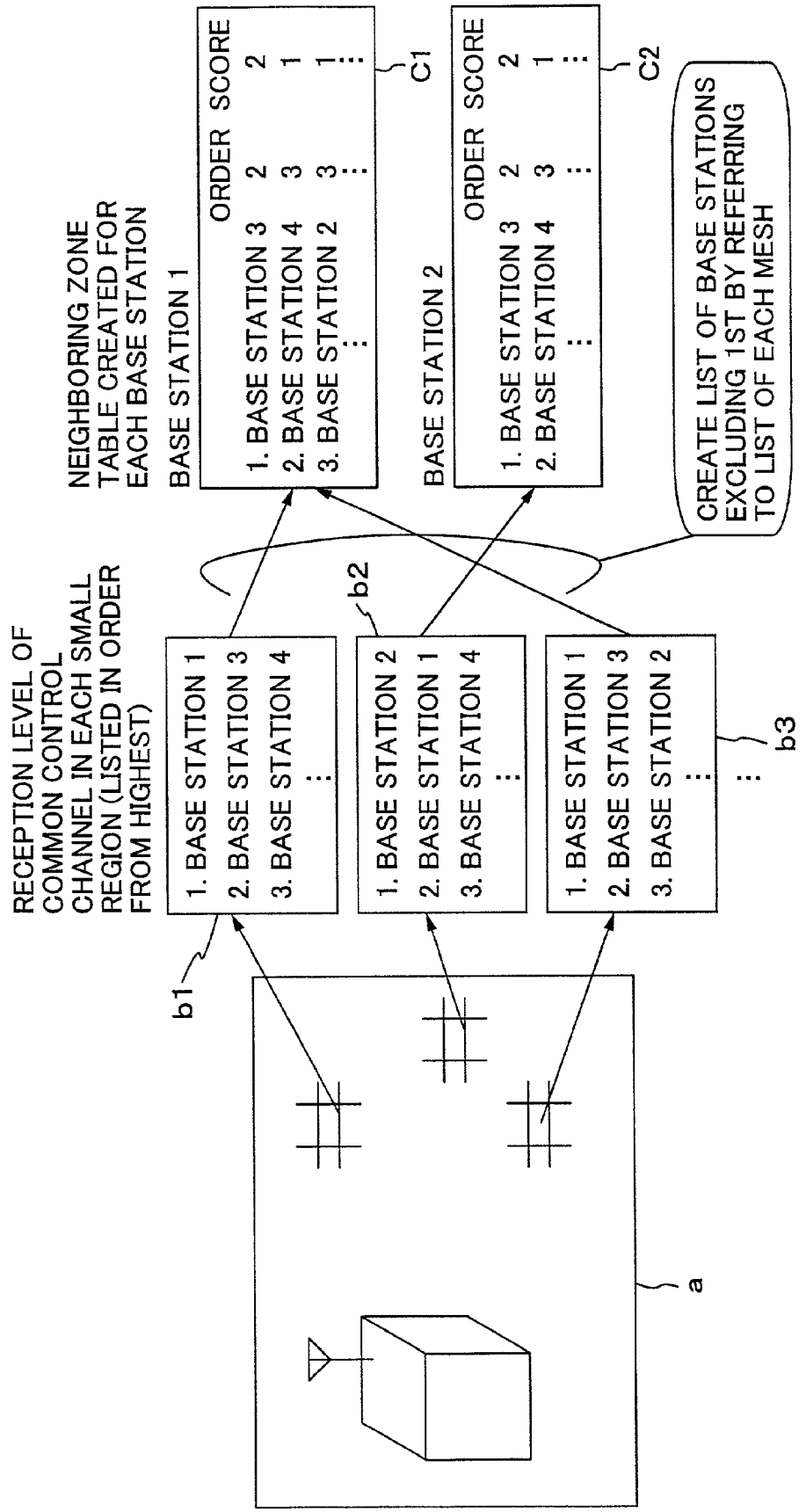
FIG. 9 is a diagram showing a relationship between the list corresponding to each small region and the neighboring zone table in the third embodiment.

The process described above is repeatedly carried out while incrementing the counter i in a step S42 until the process ends with respect to all of the elements (base stations) and the decision result in the step S41 is YES. As a result of this procedure, the elements (base stations) 3, 4 and 2 located at the second and subsequent positions in the lists b1 and b3 corresponding to the small regions e1 and e3 and having the same base station 1 located at the first position, are registered without overlap in the neighboring zone table c1 corresponding to the base station 1 located at the first position, and so that the elements (base stations) located at positions having a higher order than those of the lists b1 and b3 are registered at a higher order, as shown in FIG. 9. Furthermore, in the neighboring zone table, the elements (base stations) having the same order in each of the lists are registered at positions with a higher order for higher scores.

According to this method of creating the neighboring zone table, the base station located at the position having the higher order in the list corresponding to each small region is registered at the higher order of the neighboring zone table corresponding to each base station. In addition, of the base stations having the same order in each of the lists, the base station having the higher score is registered at the higher order. By using the neighboring zone table in which the base stations are arranged in the priority order depending on the communication quality level, it is possible to carry out a more efficient handover control with respect to the mobile station 100. For example, by successively searching the reception power such as the communication quality level of the common control channel from the base station having the higher order in the neighboring zone table, of the base stations having the same order of communication quality level, it is possible to more quickly search the base station having the same order at a larger number of local positions. As a result, the mobile station 100 can search the base station from which a better communication quality level can be obtained than the base station 200 in the radio zone in which the mobile station 100 is located, that is, search the base station to which the handover is to be made, within a shorter time.

The function of the main controller 11 shown in FIG. 2 or, the measuring apparatus 20 shown in FIG. 3, forms a quality information creating means. Processes shown in FIGS. 5, 7 or 8 form a related base station selecting means. In addition, the steps S5 and S6 shown in FIG. 5, the steps S25 and S26 shown in FIG. 7 or, the steps S35 and S36 shown in FIG. 8 form a means for selecting one base station when the same base station has a second or subsequent order of communication quality level overlap at a plurality of local positions. Furthermore, the step S2 shown in FIG. 5, the step S22 shown in FIG. 7 or, the step S32 shown in FIG. 8 form a list creating means. The steps S37 and S38 shown in FIG. 8 form a score information generating means.

As described above, according to the present invention, not only the base stations of the radio zones adjacent to the radio zone of the base station having the highest communication quality level, but also the other base stations which are selected depending on the communication quality level are included in the operation data as the base stations related to the base station having the highest communication quality level. For this reason, by using such operation data, it is possible to create operation data for handover control, which enable handover in a state where a higher communication quality level is maintained.

Further, the present invention is not limited to these embodiments, but various variations and modifications may be made without departing from the scope of the present invention.

What is claimed is:

1. An operation data creating method for creating operation data in a mobile communication system which includes a plurality of base stations within a service area and a mobile station which makes a wireless communication with the base stations, said operation data creating method comprising the steps of:

creating quality information indicating the communication quality level with respect to each base station at each of plural identified regions within a cell of the service area;

selecting a subset of first identified regions from the plural identified regions, a first base station having a highest communication quality level at each identified region in the subset of first identified regions based on the created quality information, said subset of first identified regions including a local position of the mobile station;

creating a list having base stations arranged at positions in an order form a highest communication quality level based on the created quality information, with respect to each identified region;

selecting from each list base stations having a second highest or subsequent communication quality level which is lower than the first base station at each identified region in the subset of first identified regions where the first base station has the highest communication quality level in the corresponding list based on the created quality information; and creating the operation data indicating the selected base stations as other base stations related to the first base station having the highest communication quality level.

2. The operation data creating method for the mobile communication system as claimed in claim 1, further comprising:

computing, by estimation according to a predetermined algorithm, the communication quality level with respect to each base station at each identified region within the service area; and creating the quality information based on a result of the computing.

3. The operation data creating method for the mobile communication system as claimed in claim 1, further comprising:

measuring the communication quality level with respect to each base station at each identified region within the service area; and creating the quality information based on a result of the measuring.

4. The operation data creating method for the mobile communication system as claimed in claim 1, further comprising:

selecting one of the base stations having the second or subsequent communication quality level if a same base station has the second or subsequent communication quality level at each identified region in the subset of first identified regions, when selecting the base stations having the second or subsequent communication quality level at each identified region where the first base station has the highest communication quality level.

5. The operation data creating method for the mobile communication system as claimed in claim 1, wherein:

the base stations are successively selected from the positions having the higher order in each list, when selecting the base stations located at the second or subsequent position in each list having the first base station positioned at the first position having the highest order in each list, and the operation data created indicate the selected base stations as the other base stations related to the first base station at the first position having the highest order in each list, in a state where the selected base stations are arranged in the selected order.

6. The operation data creating method for the mobile communication system as claimed in claim 5, wherein:

score information corresponding to a number of a same base station located at a same position in each list is generated, when successively selecting the base stations located at the second or subsequent positions in each list having the first base station located at the first position having the highest order in each list, from the base stations located at positions having the higher order in each list, and the operation data created indicates the selected base stations as the other base stations related to the first base station at the first position having the highest order in each list, in a state where the score information is made to correspond to the same base station located at the same position in each list.

7. The method of claim 1, further comprising:

identifying the plural identified regions within the cell of the service area.

8. An operation data creating apparatus for creating operation data in a mobile communication system which includes a plurality of base stations within a service area and a mobile station which makes a wireless communication with the base stations, said apparatus comprising:

quality information creating means for creating quality information indicating the communication quality level with respect to each base station at each of plural identified regions within a cell of the service area;

first base station selecting means for selecting a subset of first identified regions from the plural identified regions, first base station having a highest communication quality level at each identified region in the subset of first identified regions based on the created quality information, said subset of first identified regions including a local position of the mobile station;

creating a list having base stations arranged at positions in an order form a highest communication quality level based on the created quality information, with respect to each identified region;

base station selecting from each list means for selecting base stations having a second highest or subsequent communication quality level which is lower than the first base station at each identified region in the subset of first identified regions where the first base station has the highest communication quality level in the corresponding list based on the created quality information; and creating means for creating the operation data indicating the selected base stations as other base stations related to the first base station having the highest communication quality level.

9. The operation data creating apparatus for the mobile communication system as claimed in claim 8, further comprising:

said quality information creating means includes computing means for computing by estimation the communication quality level with respect to each base station at each identified region within the service area according to a predetermined algorithm, and creates the quality information based on a computed result of the computing means.

10. The operation data creating apparatus for the mobile communication system as claimed in claim 8, wherein:

said quality information creating means measures the communication quality level with respect to each base station at each identified region within the service area, and creates the quality information based on a measured result.

11. The operation data creating apparatus for the mobile communication system as claimed in claim 8, wherein:

said base station selecting means selects one of the base stations having the second or subsequent communication quality level if a same base station has the second or subsequent communication quality level at each identified region in the subset of first identified regions, when selecting the base stations having the second or subsequent communication quality level at each identified region where the first base station has the highest communication quality level.

12. The operation data creating apparatus for the mobile communication system as claimed in claim 8, wherein:
said base station selecting means successively selects the base stations from the positions having the higher order in each list, when selecting the base stations located at the second or subsequent position in each list having the first base station positioned at the first position having the highest order in each list, and
the operation data indicating the selected base stations as the other base stations related to the first base station at the first position having the highest order in each list, in a state where the selected base stations are arranged in the selected order, are created.

13. The operation data creating apparatus for the mobile communication system as claimed in claim 12, wherein:
said base station selecting means includes score information generating means for generating score information corresponding to a number of a same base station located at a same position in each list, when successively selecting the base stations located at the second or subsequent positions in each list having the first base station located at the first position having the highest order in each list, from the base stations located at positions having the higher order in each list, and
the operation data indicating the selected base stations as the other base stations related to the first base station at the first position having the highest order in each list, in a state where the score information is made to correspond to the same base station located at the same position in each list, are created.

14. The apparatus of claim 8, further comprising:
means for identifying the plural identified regions within the cell of the service area.

15. A computer-readable storage medium which stores a program for causing a computer to carry out a process of creating operation data in a mobile communication system which includes a plurality of base stations within a service area and a mobile station which makes a wireless communication with the base stations, said program comprising:
a quality information creating procedure which causes the computer to create quality information indicating the communication quality level with respect to each base station at each of plural identified regions within a cell of the service area;
a first base station selecting procedure which causes the computer to select a subset of first identified regions from the plural identified regions, a first base station having a highest communication quality level at each identified region in the subset of first identified regions based on the created quality information, said subset of first identified regions including a local position of the mobile station;
creating a list having base stations arranged at positions in an order form a highest communication quality level based on the created quality information, with respect to each identified region;
a base station selecting procedure which causes the from each list base stations having a second highest or subsequent communication quality level which is lower than the first base station at each identified region in the subset of first identified regions where the first base station has the highest communication quality level in the corresponding list based on the created quality information; and
a creating procedure which causes the computer to create the operation data indicating the selected base stations as other base stations related to the first base station having the highest communication quality level.

16. The computer-readable storage medium as claimed in claim 15, wherein:
said quality information creating procedure includes a computing procedure which causes the computer to compute by estimation the communication quality level with respect to each base station at each identified region within the service area according to a predetermined algorithm, and the quality information is created based on a computed result of the computing procedure.

17. The computer-readable storage medium as claimed in claim 15, wherein:
said quality information creating procedure causes the computer to measure the communication quality level with respect to each base station at each identified region within the service area, and the quality information is created based on a measured result.

18. The computer-readable storage medium as claimed in claim 15, wherein:
said base station selecting procedure causes the computer to select one of the base stations having the second or subsequent communication quality level in each list if a same base station has the second or subsequent communication quality level at a plurality of identified regions, when selecting the base stations having the second or subsequent communication quality level at each identified region in the subset of first identified regions where the first base station has the highest communication quality level in each list.

19. The computer-readable storage medium as claimed in claim 15, wherein:
said base station selecting procedure causes the computer to successively select the base stations from the positions having the higher order in each list, when selecting the base stations located at the second or subsequent position in each list having the first base station positioned at the first position having the highest order in each list, and
the operation data indicating the selected base stations as the other base stations related to the first base station at the first position having the highest order in each list, in a state where the selected base stations are arranged in the selected order, are created.

20. The computer-readable storage medium as claimed in claim 19, wherein:
said base station selecting procedure includes a score information generating procedure which causes the computer to generate score information corresponding to a number of a same base station located at a same position in each list, when successively selecting the base stations located at the second or subsequent positions in each list having the first base station located at the first position having the highest order in each list, from the base stations located at positions having the higher order in each list, and
the operation data indicating the selected base stations as the other base stations related to the first base station at the first position having the highest order in each list, in a state where the score information is made to correspond to the same base station located at the same position in each list, are created.

21. The computer-readable storage medium of claim 15, said program further comprising:

a region identifying procedure configured to identify the plural identified regions within the cell of the service area.

22. An operation data creating apparatus for creating operation data in a mobile communication system which includes a plurality of base stations within a service area and a mobile station which makes a wireless communication with the base stations, said apparatus comprising:

a quality information creating part configured to create quality information indicating the communication quality level with respect to each base station at each of plural identified region within a cell of the service area;

a first base station selecting part configured to select a subset of first identified regions from the plural identified regions, a first base station having a highest communication quality level at each identified region in the subset of first identified regions based on the created quality information, said subset of first identified regions including at least one identified region within the service area;

creating a list having base stations arranged at positions in an order form a highest communication quality level based on the created quality information, with respect to each identified region;

a base station selecting part from each list, base stations having a second highest or subsequent communication quality level which is lower than the first base station at each identified region in the subset of first identified regions where the first base station has the highest communication quality level in the corresponding list based on the created quality information; and a creating part configured to create the operation data indicating the selected base stations as the other base stations related to the first base station having the highest communication quality level.

23. The apparatus of claim 22, further comprising:

a region identifying part configured to identify the plural identified regions within the cell of the service area.

* * * * *